United States Patent Office 2,809,167
Patented Oct. 8, 1957

2,809,167
DIVALENT TIN ACTIVATED STRONTIUM AND STRONTIUM-BARIUM TETRAPHOSPHATE PHOSPHORS

Alfred H. McKeag, North Wembley, England, assignor to General Electric Company, a corporation of New York No Drawing. Application September 21, 1954,
Serial No. 457,537

Claims priority, application Great Britain
September 28, 1953

5 Claims. (Cl. 252—301.4)

This invention relates to artificial luminescent materials, one of its objects being the provision of luminescent materials which differ from previously known luminescent materials in composition, and which are suitable for use in fluorescent electric discharge lamps, or for cathode ray tube screens, or for X-ray screens, or for two or more of these purposes. The invention also relates to a method of manufacturing such luminescent materials and to combinations of these materials with electrical means for exciting them to luminescence, for example electric discharge lamps and cathode ray tubes.

Luminescent materials comprising strontium phosphates with various metallic activators have previously been described; thus, materials of composition corresponding to that of the metaphosphate ($Sr(PO_3)_2$), or to phosphates containing higher proportions of phosphorus pentoxide, have been described, and in British patent specification No. 680,846 luminescent materials comprising strontium pyrophosphate, $Sr_2P_2O_7$, activated by tin, and optionally also by manganese, are described.

According to the present invention, an artificial luminescent material consists of or includes strontium phosphate having substantially the composition represented by the formula $3SrO.2P_2O_5$, activated by tin so as to be excitable to luminescence by ultraviolet radiation of wave length 2537A.

According to a further feature of the invention, the luminescent material may also contain manganese as an additional activator.

The composition of the luminescent materials of the invention corresponds to that of a salt of tetraphosphoric acid, $H_6P_4O_{13}$, and the materials will accordingly be referred to herein as tetraphosphates. The use of the word "substantially" in the above statement of the invention is to be understood to imply that the material may contain a slight excess of strontium oxide, or of phosphorus pentoxide, over the stoichiometric proportions of these constituents contained in the tetraphosphate composition, provided that such excess is not sufficiently great to affect appreciably the crystal structure of the material. Furthermore, the materials of the invention may contain varying proportions of barium tetraphosphate, $3BaO.2P_2O_5$, in solid solution and may be regarded as barium strontium tetraphosphates having substantially the composition $3(Ba,Sr)O.2P_2O_5$. The barium may range in proportion up to 50% by weight of the strontium. It will be understood that a solid solution of this kind is to be regarded as a material including strontium tetraphosphate.

The proportion of tin required to function as activator for the luminescent materials of the invention is not critical, and may be varied over a wide range, but is preferably not higher than 10% by weight of the material. I have found that particularly useful materials are obtained when the amount of tin used is from 1% to 2% by weight of the material. However, considerably smaller proportions of tin will provide useful materials and it is virtually impossible to draw a precise dividing line between useful and non-useful materials with very small concentrations of activators; generally speaking, the tin concentrations may be as little as the order of 0.001% by weight of the material. It is apparently desirable that the tin should be present in the divalent state, and it is therefore usually preferable to introduce the tin initially in the form of a stannous compound, such as stannous chloride, $SnCl_2$. Also, to insure that the tin is maintained in the reduced condition, the material is preferably heated in a reducing atmosphere during at least a part of the process of manufacture.

The proportion of manganese which may be included in the materials as an additional activator is also preferably not greater than 10% by weight of the material, the amount used depending in each case upon the color of luminescence which it is desired to produce. Thus, the strontium tetraphosphate materials activated by tin alone exhibit luminescence of a pale blue color when excited by ultraviolet radiation of wave length 2537A., by cathode rays or by X-rays, and the addition of manganese results in a shift in the color of the luminescence toward the red end of the spectrum, the amount of the shift increasing with increasing proportions of manganese, so that strontium tetraphosphate materials giving luminescence of bluish-white, white, pinkish-white and pink colors may be obtained by using varying amounts of manganese. The preferred range of manganese concentrations is 2% to 5% by weight of the material; however, even extremely small amounts have an observable effect. It may be stated that manganese has no effect on the barium compounds; it only modifies the color of the strontium compound, and apparently only affects barium-strontium tetraphosphate solid solutions which contain 50% or more of the strontium compound.

The method of manufacturing a luminescent material in accordance with the invention includes the step of heating a mixture of strontium tetraphosphate, or a substance or substances adapted to produce a material having substantially the strontium tetraphosphate composition during the heating, with a compound of tin, and optionally also with a compound of manganese, at an elevated temperature, for example in the range of 600° C. to 1150° C., in a reducing atmosphere, preferably hydrogen. The compounds of tin and manganese employed are preferably phosphates of such composition that they are converted on heating to compounds having substantially the tetraphosphate composition. The temperature used should not be so high that phosphorus pentoxide may be lost by volatilization, with consequent formation of some strontium pyrophosphate. In order to safeguard against this possibility, it may be desirable to include an excess of phosphate in the mixture heated.

The substance or substances adapted to produce strontium tetraphosphate on heating may be a strontium phosphate, or mixture of strontium phosphates including strontium hydrogen phosphate ($SrHPO_4$), or a mixture of strontium hydrogen phosphate and diammonium hydrogen phosphate in suitable proportions. The strontium hydrogen phosphate is obtained by precipitation from solutions of a strontium compound, such as strontium chloride, and a phosphate, preferably diammonium hydrogen phosphate. The precipitated strontium phosphate, after washing and drying, may be heated with the appropriate amount of diammonium hydrogen phosphate, a tin compound and optionally a manganese compound, or the tin and manganese, if required, may be precipitated with the strontium phosphate from a solution containing a stannous compound and, if desired, a manganese compound, and this combined precipitate then heated with diammonium hydrogen phosphate.

In an alternative method of preparing a luminescent material according to the invention, a powdered strontium compound, such as strontium carbonate, may be heated with a powdered phosphate, preferably diammonium hydrogen phosphate, in the required proportions, together with suitable compounds of tin and, if desired, manganese.

For the manufacture of a material in accordance with the invention, which is a solid solution of strontium and barium tetraphosphates, the barium tetraphosphate, or a substance or substances adapted to produce a material having substantially the barium tetraphosphate composition when heated, is included in the starting materials in the methods as described above, and the required solid solution is produced during the heating.

Preferably the heating is carried out in a reducing atmosphere during only a part of the process, one or more stages consisting of heating in air being also included in the process. I have found that to produce luminescent materials in accordance with the invention, giving the optimum brightness of luminescence, it is usually desirable to carry out the heating in three stages, the first and third stages being effected in air, and the second in hydrogen.

It is to be understood that the materials used in the manufacture of the luminescent materials of the invention must be of a high degree of purity as is usual in the manufacture of luminescent materials.

Some specific methods of preparing luminescent materials in accordance with the invention will now be described by way of example.

*Example 1*

Strontium hydrogen phosphate, $SrHPO_4$, containing tin, is first prepared by precipitation in the following manner:

267 grams of strontium chloride, $SrCl_2.6H_2O$, and 6.6 grams of stannous chloride, $SnCl_2.2H_2O$, are dissolved together in a liter of water, and the solution is heated to 60° C. A second solution is prepared, consisting of 136 grams of diammonium hydrogen phosphate, $(NH_4)_2HPO_4$, in a liter of water, and is also heated to 60° C., and is then added to the solution of strontium and tin chlorides. The resulting precipitate is stirred for 5 minutes, and is then allowed to stand for 30 minutes, filtered, washed ten times with distilled water, dried at 200° C., and ground to a fine powder.

For the preparation of the luminescent material, 55 grams of the powdered phosphate precipitate, prepared as described above, are ground with 13 grams of diammonium hydrogen phosphate, and this mixture is heated in air at 900° C. for half an hour, then in hydrogen at 900° C. for half an hour, and finally in air at 900° C. for half an hour.

The product is ground to give a powder having substantially the composition $3SrO.2P_2O_5$ with 2% by weight of tin. This material shows a pale blue fluorescence under excitation by ultraviolet radiation of wave length 2537 A. A material manufactured in this way was examined by X-ray analysis and can be defined by the interplanar spacings $(d)$ of the most prominent X-ray reflections as set forth in the following table. The degrees of accuracy to which the spacings were measured are indicated in the table; the measurements have not been corrected for absorption, etc. The relative intensities of the lines are also indicated in the table. These data were obtained by the method of X-ray analysis set forth in the pamphlet designated by No. E43–49T issued by the American Society for Testing Materials in 1942, and revised in 1946 and 1949.

| $d$ (A.) | Intensity |
|---|---|
| 4.58±0.01 | Weak. |
| 3.51±0.005 | Moderate. |
| 3.394±0.005 | Do. |
| 3.199±0.005 | Strong. |
| 3.026±0.005 | Moderate-Weak. |
| 2.950±0.005 | Do. |
| 2.740±0.005 | Moderate. |
| 2.669±0.005 | Do. |
| 2.466±0.005 | Weak. |
| 2.104±0.005 | Weak-Moderate. |
| 2.019±0.005 | Do. |

*Example 2*

For the manufacture of a luminescent material containing 2% by weight of manganese as an additional activator, a precipitate consisting mainly of strontium hydrogen phosphate, and also containing tin and manganese, is prepared in the manner described in Example 1, with the difference that the solution of strontium chloride and stannous chloride also contains 15.8 grams of manganous chloride, $MnCl_2.4H_2O$. 55 grams of this precipitate are heated with 13 grams of diammonium hydrogen phosphate in the manner described in Example 1, the method of preparation being exactly the same as that of Example 1.

The product obtained gives a pinkish-white fluoresence under excitation by ultraviolet radiation of wave length 2537 A.

*Example 3*

A strontium-barium tetraphosphate in which the Sr:Ba ratio is 50:50 may be prepared as follows:

A precipitate of barium hydrogen phosphate ($BaHPO_4$) containing tin is prepared in the same way as the corresponding strontium compound, $SrHPO_4$, as described in Example 1, the weight of barium chloride, $BaCl_2.2H_2O$, used being 244 grams, and the tin-containing $SrHPO_4$ and $BaHPO_4$ are mixed in equimolecular proportions, with 20% excess diammonium hydrogen phosphate, by weight, calculated as a percentage of the weight of the precipitated barium and strontium phosphates after heating, that is, after the removal of water from $BaHPO_4$ and $SrHPO_4$. This mixture is then heated in three stages as described for the strontium compound in Example 1, the temperature used for the hydrogen firing step being varied from 700° C. to 900° C. according to the color of luminescence desired.

A solid solution of strontium and barium tetraphosphates will show colors of luminescence intermediate between those of the strontium compound alone and the barium compound alone, depending upon the relative proportions of the strontium and barium compounds present, and depending also upon the firing temperatures employed. The table below indicates the colors of luminescence shown, under excitation by ultraviolet radiation of wave length 2537 A., by the tetraphosphate materials in which the Ba:Sr ratio is 50:50, and which have been fired at different temperatures, in comparison with the colors shown by the pure barium and pure strontium compounds fired at the same temperatures. Each of these materials was activated by 2% of tin, by weight, but contained no manganese.

| Firing Temp. (in $H_2$) | Pure Ba Compound | 50:50 Ba:Sr | Pure Sr Compound |
|---|---|---|---|
| 700° C | Cream | Pale blue | Blue. |
| 800° C | Pale Cream | Pale green | Blue. |
| 900° C | Blue | Green blue | Blue. |

*Example 4*

For the preparation of a strontium-barium tetraphosphate in which the Sr:Ba ratio is 70:30, the method differs from that described in Example 3 only in that the $SrHPO_4$ and $BaHPO_4$ are mixed in the molecular proportions of 70:30 instead of in equimolecular proportions. In addition, 1% manganese may be included in this material by adding 7.9 grams of manganous chloride, $MnCl_2.4H_2O$, to each of the strontium chloride-stannous chloride and barium chloride-stannous chloride solutions from which the phosphate precipitates are produced. The firing temperature makes little difference to the emission characteristics of materials of this composition, the color being pale blue in the case of the materials without manganese and creamy-white in the case of the materials containing manganese.

What I claim as new and desire to secure by Letters Patent of the United States is:

1. A fluorescent material comprising a matrix of the group consisting of strontium phosphate having substantially the composition represented by the formula $3SrO \cdot 2P_2O_5$ and solid solutions thereof with up to 50% by weight of barium phosphate having substantially the composition represented by the formula $3BaO \cdot 2P_2O_5$, and an activator proportion of metal of the group consisting of divalent tin and mixtures of divalent tin with manganese.

2. A fluorescent material comprising a matrix of strontium phosphate having substantially the composition represented by the formula $3SrO \cdot 2P_2O_5$, and an activator proportion of metal of the group consisting of divalent tin and mixtures of divalent tin with manganese.

3. A fluorescent material comprising a matrix of the group consisting of strontium tetraphosphate, $3SrO \cdot 2P_2O_5$, and solid solutions of strontium-barium tetraphosphate, $3(Ba,Sr)O \cdot 2P_2O_5$, wherein the barium ranges in proportion up to 50% of the strontium, and activator metal consisting of about .001% to 10% by weight of divalent tin and 0 to 10% by weight of manganese.

4. A fluorescent material comprising a matrix of strontium-barium tetraphosphate, $3(Ba,Sr)O \cdot 2P_2O_5$, wherein the Sr:Ba ratio is 50:50, and an activator proportion of metal of the group consisting of divalent tin and mixtures of divalent tin with manganese.

5. A fluorescent material comprising a matrix of strontium-barium tetraphosphate, $3(Ba,Sr)O \cdot 2P_2O_5$, wherein the Sr:Ba ratio is 70:30, and an activator proportion of metal of the group consisting of divalent tin and mixtures of divalent tin with manganese.

References Cited in the file of this patent

UNITED STATES PATENTS

| | | |
|---|---|---|
| 2,619,471 | Butler | Nov. 25, 1952 |

FOREIGN PATENTS

| | | |
|---|---|---|
| 680,846 | Great Britain | Oct. 15, 1952 |
| 701,266 | Great Britain | Dec. 23, 1953 |